Nov. 14, 1967  H. THAMS  3,352,060
PLASTIC WINDOW AND PROCESS FOR MAKING SAME
Filed April 19, 1965  2 Sheets-Sheet 1
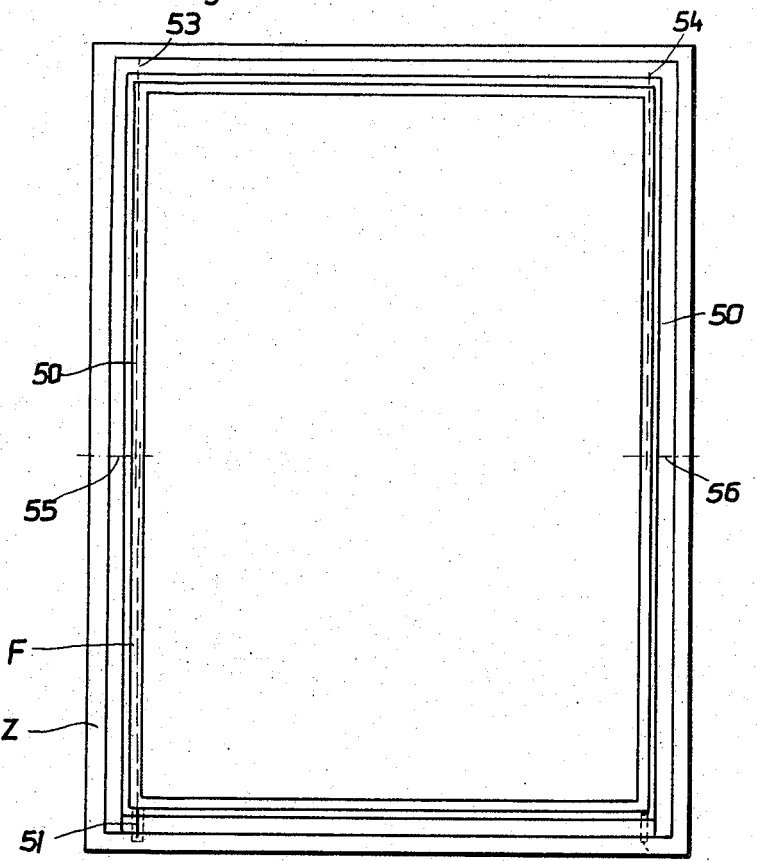
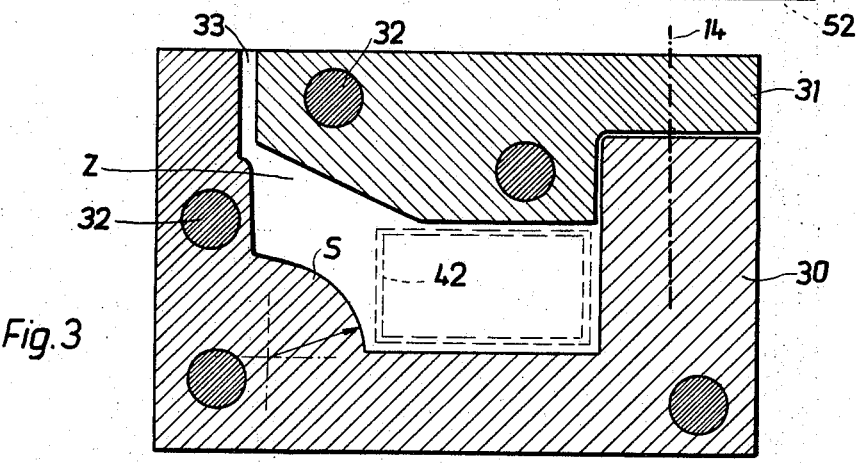
Inventor:
HANS THAMS
By Hammond & Littell
ATTORNEYS Nov. 14, 1967  H. THAMS  3,352,060
PLASTIC WINDOW AND PROCESS FOR MAKING SAME
Filed April 19, 1965  2 Sheets-Sheet 2
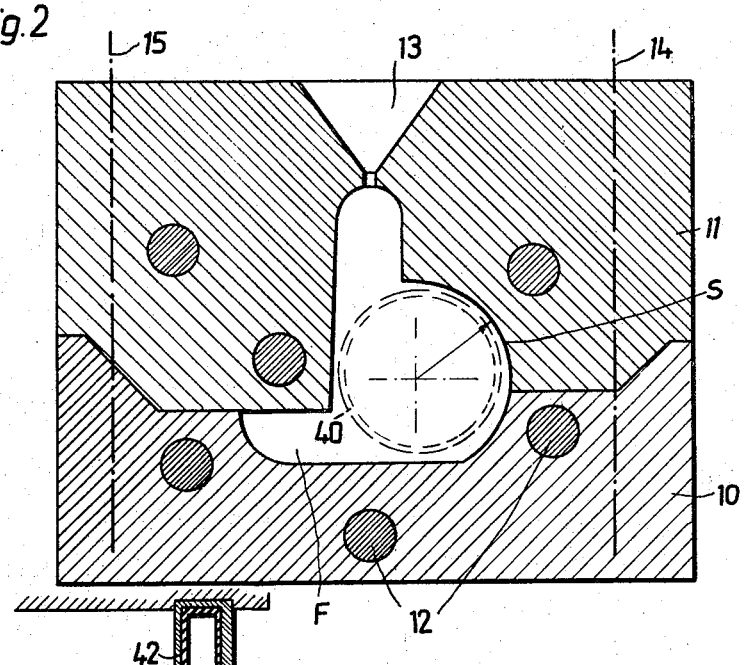
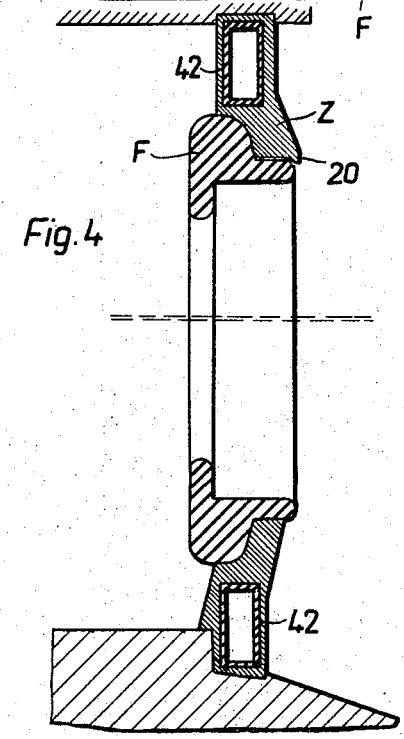
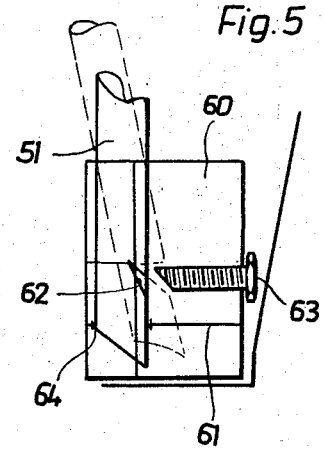
Inventor:
HANS THAMS
By Hammond & Littell
ATTORNEY

United States Patent Office 3,352,060
Patented Nov. 14, 1967

3,352,060
PLASTIC WINDOW AND PROCESS FOR
MAKING SAME
Hans Thams, Ellernreihe 64/5, Hamburg,
Bramfeld, Germany
Filed Apr. 19, 1965, Ser. No. 449,017
Claims priority, application Germany, Apr. 20, 1964,
T 26,045; Apr. 10, 1965, T 28,362
3 Claims. (Cl. 49—192)

ABSTRACT OF THE DISCLOSURE

A novel plastic tiltable and swingable window comprised of a window wing having about its periphery a circular segment sealing profile and a window frame having a corresponding circular profile cast from the said window wing and a method of producing the said window.

---

Windows and similar building elements made of plastics are heat-sealed according to well-known manufacturing methods by joining profiled plastic ledges or prefabricated molded pieces or else the prefabricated elements are joined by gluing, screwing, or the like. Plastic windows in which the wings and frames are made as a whole, for example by hot-pressing processes, are also known.

In these known manufacturing processes the individually produced parts must be subsequently adapted to each other and at least the fittings by which the parts of the window can be moved, must be attached thereto later. This requires additional mechanical operations.

The object of the invention is to improve the manufacture of plastic windows by giving the wings and frames to be produced in one piece each the definite form in which they will be used and fitted, during the casting process. The invention also covers the molds for the making of such windows. The invention comprises shaping a window in one piece in the mold out of casting resins, with a segment-shaped tightly fitting profile integral therewith, the frame profile being directly molded from the cast wing profile, the wing and frame being connected with each other so as to enable swinging and tilting around an axis having the common radius of the two tightly fitting profiles. The frame profile is made in such a manner that a prototype of the frame is cast directly from the wing profile in the area of the segment-shaped, tightly fitting profile and that the frame is molded so as to exhibit, on the side which will later be the outside of the window, a draining groove in the water bar and a cover strip and a draining ledge at the other bars.

The manufacturing process starts with the separately made prototype of the wing profile which is shaped in a molding frame which will later form the bottom of the mold, using plastic ramming masses to which aluminum powder has been added. The upper part of the mold is then made in the same manner and the top and bottom of the mold are then connected with each other by a hinge arrangement. The prototype of the frame is cast, in a second mold, from a finished wing so as to provide one mold each for the wing and for the frame of the window to be employed in the continuous production according to plastic casting processes. The top parts are provided with a continuous slit for filling and ventilation along the entire circumference of the mold.

The production of the cast plastic windows in the molds constructed according to the present invention is carried out in such a manner that frames of tube profiles corresponding approximately to the maximum total cross-section possible of the wing and/or frame profiles are inserted into the open molds, the tubes being provided with means to receive the fittings of the future window and with slits for the operating levers and the like which will be attached thereto later.

These tube frames are then placed into a central position in the mold defined by the outer cross-section of the prefabricated parts and wholly covered with casting resin so that one piece is formed.

Into the mold into which the frame is cast and along the locking fixtures, a metal sheath of approximately oval cross-section is cast at the side which will later be the base at which the window can be tilted. The said metal sheath must be deeper than the predetermined travel path of the lock bolts the free ends of which protrude into the cast sheaths when the window is in the tilted position. While in the tilted position, the window is held in the cast sheaths which also accommodate means radially engaging a recess in the bolt end, to secure the arrangement against wrong manipulations, such as safety screws and the like. The locking fixtures and the elements by which the swinging and tilting movements of the window are controlled are fitted upon the vertical parts of the wing in the area where the tube slits of the cast tube profiles are positioned.

The making of the windows according to the present invention is demonstrated by illustrative examples in the drawing. The drawing also illustrates the construction of the window and the casting molds used.

FIG. 1 shows a window inserted into a frame, as seen from outside.

FIG. 2 shows a vertical section through a casting mold used for making the wing of a window.

FIG. 3 shows the corresponding cross-section through a mold used for making a window frame.

FIG. 4 is a vertical section through a closed window constructed according to the invention and fitted into a wall.

FIG. 5 is a partial view of the guide sheath cast into the bar at the base of a window frame to receive the lock bolts.

A window made according to the present invention comprises a wing and a frame. The two parts are cast in one piece each, and the process of making them will be demonstrated hereinafter by the following illustrative example:

A prototype of the wing having the exact outer dimensions required is made e.g. of wood. It is coated with a high-gloss varnish coating which, when hard, has an entirely smooth surface. This prototype is inserted into a mold frame which may also be made of wood. Then all sides of the prototype are painted with a parting compound, for example one containing silica, upon which a gel hardening at room temperature is coated after drying. After setting the gel is provided with another coating having a width of about 2 mm. or 3 mm. and these two layers will later form the surface of the inside of the mold.

Prior to the complete hardening of the above-mentioned intermediate layers, the mold proper is made of ramming masses comprising plastics or synthetic resins capable of hardening and to which fillers, such as aluminum powder or quartz sand, are added. When the parting surface between the upper and lower molds is complete, the upper mold is also filled by ramming and the whole mold is then preferably heated to hasten hardening, the heating temperature depending on the composition of the ramming masses. The prototype may then be taken from the hardened mold so that the plastic mold from which any desired number of wings can be cast, is available.

In FIG. 1 the wing of the window to be cast is referred to as F. The wing is shown in the profile of the inner space of the mold which comprises the lower part 10 and the upper part 11. Reinforcing irons 12 are inserted into the ramming masses of which the parts of the mold are made. The place where the mass is filled in is referred to as 13. 14, 15 mark the places where means for closing the mold during the casting operation may be provided. The mold parts 10 and 11 are preferably connected with each other by hinges so as to enable folding.

The above-described casting operation is also applied in the making of the frame. The parting compounds, intermediate layers and ramming masses correspond to the above-described items. Another inventional feature, however, is that the wing F has, in one part of its outer surface, a section S having segment-shaped contours and that, in order to make the prototype of the frame, this segment is so cast from a wing that its contours on the frame Z will be parallel to those of the wing. In order to achieve this, a finished wing is inserted into a frame so as to provide the surface of the lower mold for the making of the future frame. The mold frame is then filled with rapidly hardening casting resins in such a manner that the segment S assumes its precise shape. The other outlines of the frame are formed in accordance with the above-described making of the mold by means of ramming masses blended with aluminum powder. During this operation the future means to fasten the window to the walls are formed and lugs 20 protruding from the outer edges of the wing are cast integral therewith, as a further feature of the invention. In what will later be the water bar, a draining groove having draining apertures is provided.

Accordingly, the mold for the making of the frame shown in FIG. 3 comprises the lower mold 30, the upper mold 31, with reinforcements 32, and the filling slit 33. The means for joining the parts of the mold may again be hinge-like arrangements.

The casting of the windows and frames which form one piece each is described as follows for a window wing: Into the inside of the open mold shown in FIG. 2 a tube frame 40 is inserted which occupies the maximum possible cross-section in the total profile of the wing F, as suggested in FIG. 2. The inside of the mold is coated with a parting compound. Then the mold is closed and casting resin is filled in through the filling aperture 13 which is in the form of a filling and ventilating slit along the whole circumference of the mold. The casting resin should preferably be filled in simultaneously at several places.

Into the frame 40 which is made of the tube profiles the means for the actuation of the wing are inserted with guide rods as well as supporting and tilting bolts. The guide rods are suggested at 50, while the supporting and tilting bolts are referred to as 51, 52, 53, 54. The actuating means, such as swing levers or the like, are placed upon the surface of the wing and the tube profiles 40 have surface slits, preferably at 55, 56, into which the actuating means may be inserted from outside, after the thin ridge of casting resin has been removed from the area of the slits.

The casting process for making the frame Z is carried out in the above-described manner, using a mold of the type shown in FIG. 3. Prior to casting, oval sheaths 60 are inserted at the lower edge of the frame mold which are deeper than the travel path of the lock bolt, as e.g. 51. The sheath 60 should preferably have an intermediate bottom 61 which exhibits a perforation corresponding to the diameter of bolt 51. The free end of bolt 51 has a recess 62 into which the tip of a securing screw 63 protrudes so as to offer a safeguard against wrong manipulations. FIG. 5 shows the sheath 60 for the swing bolt 51, an arrangement that will be referred to in detail hereinafter in the instructions for operation. The maximum cross-section possible of the interior of the mold used in the making of the frame Z is filled by a rectangular profile tube 42 as indicated by a broken line in FIG. 3.

The casting resins used are thinly liquid epoxide resins which harden at room temperature, and can be processed so as to enable precise molding.

The wings and frames of the window which are made separately, in one piece each, are so joined to each other according to FIG. 4, that the segments S lie upon one another. As a result a guided path is provided for the wing and frame Z both for the swinging and for the tilting movement of the window. The change from one of the movements (which are known per se) to the other is effected by means of actuating elements 55, 56, which are connected with the actuating rods 50 by rack and pinion arrangements or the like. The dimensioning of the stroke of the lock bolt 51 in the sheath 60 gives the bolt freedom to swing the wing which may then e.g. be swung around the bolts 52, 54. After retraction of the free end of bolt 51 into the sheath 60, or into the perforation 64 of the intermediate bottom 61, the wing F may be tilted when the lock bolts 53, 54 have been retracted. The bolts 51 and 52 will then assume the position shown by the broken line in FIG. 5 for the bolt 51 which is supported in the metal sheath 60 to maintain the tilting position.

The advantage of a window made according to the present invention is that the wing and frame are supported by the segment S both in the swinging and in the tilting position when the appropriate movements are made. Since the segment S of the frame has been molded from the segment of the wing F, the two do not only form a support but the coverage, shown in FIG. 4, of the two parallel curves results in the two parts of the window tightly fitting into one another, even if no elastic sealing means are employed. Another advantage is that the precise fitting of the two segments S enables close guidance in any opening position, i.e. whenever the window is swung or tilted open. Since, moreover, the support pressure is distributed over a larger area by the guide surface, the fittings used may be simple and of light construction.

From the process point of view, a window made according to the present invention produces the advantage that all elements can be assembled so as to fit tightly, without any retouching being required. The means for inserting the fixture elements are provided in the tube frame 40 before the casting process is initiated. Retouching can be limited to the attachment of the actuating means, since the slits in the tube profiles 40 are provided with the necessary fitting or engaging means before the tubes are placed into the casting mold. The windows may be made in any colour desired and the casting resin may be chosen in dependence on the temperature or other conditions prevailing at the place where the window is assembled. There will be no difficulty in changing the shapes of windows, since the molds prepared according to the present invention are of simple construction and ensure the making of very exact castings. The retouchings work on the parts cast is limited to the removal of the ridges produced at the casting slits which are very thin.

What I claim is:

1. A plastic tiltable and swingable window comprising a one-piece plastic wing and a one-piece plastic window frame provided with tubes in the profiles thereof which fill the maximum cross-section of the said profiles, movable lock bolts within the upper portion of the tube of each vertical member of the window wing capable of engaging recesses in the upper horizontal member of the window frame for locking, a supporting and tilting bolt at the bottom of one of the vertical members of the window wing which engages a recess in the window frame, a moveable lock bolt within the lower portion of the tube of the second vertical member of the window frame capable of engaging a recess in the window frame and means for moving the lock bolts in the window wing, the said window wing having a curved portion engaging the frame and a flange overlapping the inner profile of the window frame and the said window frame having a profile tightly fitting the curved portion of the said window wing whereby the wing and frame are swingable and tiltable about an axis having the common radius of the tightly fitting profiles.

2. The window of claim 1 wherein the recesses in the lower member of the window frame are provided with means which engage the tilting bolt and the slidable bolt when the window wing is in the tilted position.

3. A process for the production of a sealed plastic swingable and tiltable window comprised of a one-piece plastic window wing and a one-piece plastic window frame, the said wing having about its periphery a circular sealing profile engaging the frame and a flange which overlaps the inner profile of the frame and the said frame having an inner circular profile cast directly from the window wing profile and means connecting the said wing and the said frame whereby they are tiltable and swingable about an axis having the common radius of the circular profiles which comprises molding a one-piece plastic window wing having about its periphery a circular sealing profile and a flange thereon, molding a one-piece plastic window frame with its inner profile cast directly from the said wing profile and connecting the window wing and frame to each other so as to be swingable and tiltable about an axis having the common radius of the circular profiles.

References Cited

UNITED STATES PATENTS

| 1,268,554 | 6/1918 | Elliott | 49—401 |
| 3,087,207 | 4/1963 | Styra | 52—309 |
| 3,190,411 | 6/1965 | Pasche | 49—401 |

FOREIGN PATENTS

| 598,004 | 5/1960 | Canada. |
| 1,295,426 | 5/1962 | France. |
| 571,301 | 1/1958 | Italy. |

KENNETH DOWNEY, *Primary Examiner.*